(12) United States Patent
Asbeck

(10) Patent No.: US 7,881,512 B2
(45) Date of Patent: Feb. 1, 2011

(54) METHOD AND APPARATUS FOR DETERMINING THE SPATIAL PROFILE OF A VESSEL AXIS IN VOLUME DATA RECORDS FOR MEDICAL IMAGING

(75) Inventor: Christian Asbeck, Bamberg (DE)

(73) Assignee: Siemens Aktiengesellschaft, Munich (DE)

( * ) Notice: Subject to any disclaimer, the term of this patent is extended or adjusted under 35 U.S.C. 154(b) by 868 days.

(21) Appl. No.: 11/826,435

(22) Filed: Jul. 16, 2007

(65) Prior Publication Data

US 2008/0025587 A1 Jan. 31, 2008

(30) Foreign Application Priority Data

Jul. 17, 2006 (DE) .................. 10 2006 032 990

(51) Int. Cl.
*G06K 9/00* (2006.01)
(52) U.S. Cl. .................. 382/128; 128/922; 378/4
(58) Field of Classification Search .................. 382/100, 382/128, 129, 130, 131, 132; 128/922; 378/4–27
See application file for complete search history.

(56) References Cited

U.S. PATENT DOCUMENTS

| | | | |
|---|---|---|---|
| 6,879,711 B2* | 4/2005 | Maurincomme et al. .... | 382/128 |
| 7,170,533 B2 | 1/2007 | Launay et al. | |
| 7,369,691 B2* | 5/2008 | Kondo et al. .................. | 382/128 |
| 7,376,253 B2* | 5/2008 | Spreeuwers et al. ......... | 382/131 |
| 7,447,373 B2* | 11/2008 | Bober ......................... | 382/251 |
| 2001/0036303 A1* | 11/2001 | Maurincomme et al. .... | 382/132 |
| 2004/0114789 A1* | 6/2004 | Saha et al. .................. | 382/128 |
| 2004/0249270 A1* | 12/2004 | Kondo et al. ................ | 600/425 |
| 2006/0171585 A1 | 8/2006 | Rinck et al. | |

FOREIGN PATENT DOCUMENTS

| | | |
|---|---|---|
| DE | 10 2004 004451 A1 | 8/2004 |
| DE | 10 2004 043676 A1 | 3/2006 |

\* cited by examiner

*Primary Examiner*—Anand Bhatnagar
(74) *Attorney, Agent, or Firm*—Harness, Dickey & Pierce. P.L.C.

(57) ABSTRACT

At least one embodiment of the present invention relates to a method and/or an apparatus for determining the spatial profile of a vessel axis in volume data records for medical imaging, in particular for producing slice images of vessels which are obtained by curved planar reformation CPR and can be rotated freely. In at least one embodiment of the method, the vessel axis is marked interactively on the displayed MPR or MIP images by marking points using a two-dimensional coordinate system. Depth information is derived automatically for each marking point from the known position of the respective image in the stack or using the known calculation procedure for MIP images, and the marking points are extended in dimension on the basis of the depth information in order to obtain extended marking points using a three-dimensional coordinate system. The three-dimensional profile of the vessel axis, which is used for producing CPR images which can be rotated freely, is then obtained by linking the extended marking points. The method makes it possible, in at least one embodiment, to determine the profile of the vessel axis with less time and computation effort.

19 Claims, 2 Drawing Sheets

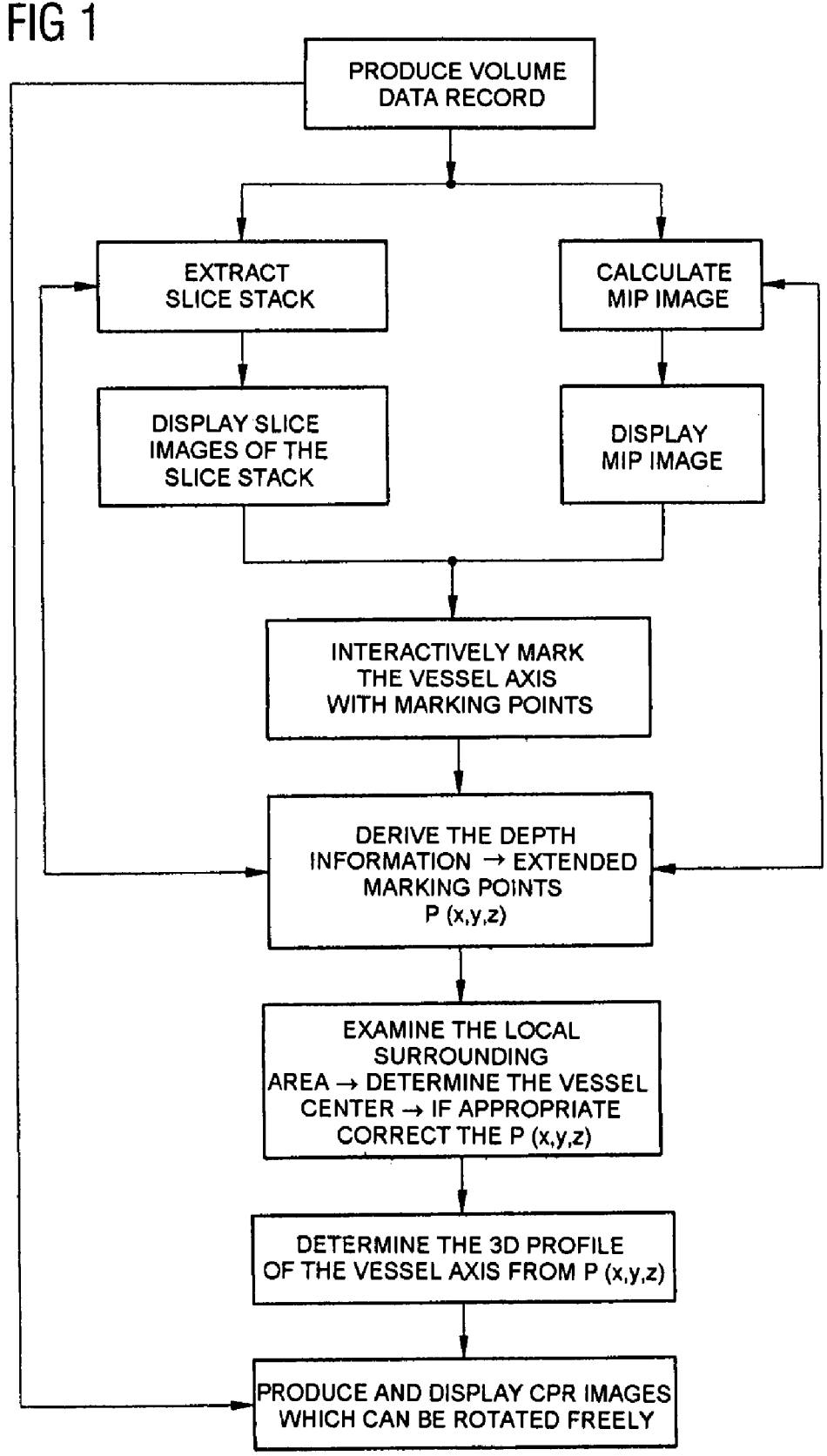

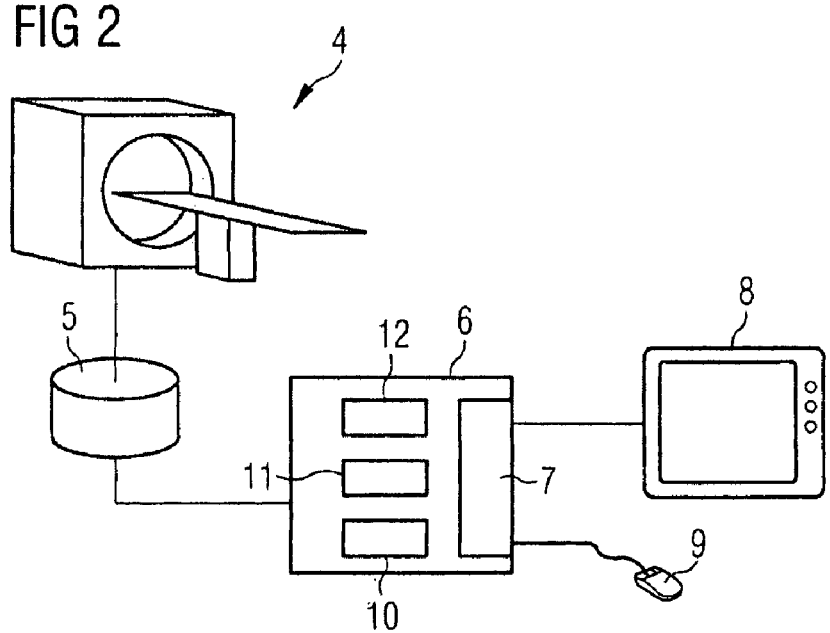
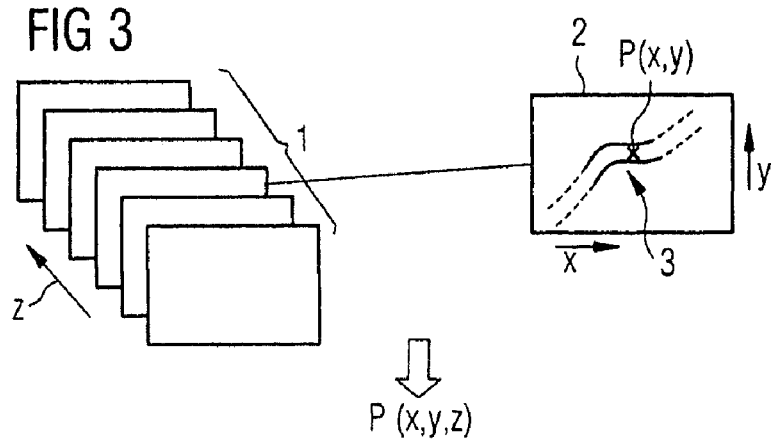

METHOD AND APPARATUS FOR DETERMINING THE SPATIAL PROFILE OF A VESSEL AXIS IN VOLUME DATA RECORDS FOR MEDICAL IMAGING

PRIORITY STATEMENT

The present application hereby claims priority under 35 U.S.C. §119 on German patent application number DE 10 2006 032 990.2 filed Jul. 17, 2006, the entire contents of which is hereby incorporated herein by reference.

FIELD

Embodiments of the present invention generally relate to a method and/or an apparatus for determining the spatial profile of a vessel axis in volume data records for medical imaging, for example for producing slice images of vessels which are obtained by curved planar reformation (CPR) and can be rotated freely.

BACKGROUND

Suitable visualization of the blood vessels plays a major role for numerous applications in medical imaging. This relates in particular to the identification of stenoses which may be caused by atherosclerotic lesions, such as calcification and/or soft plaque. It should be possible to identify and evaluation stenoses well in the scan images recorded from the patient. The known slice images which are obtained by multiplanar reformation (MPR) from a volume data record are suitable only to a restricted extent for this purpose since they generally each represent only a short section of a vessel which is currently located on the corresponding slice plane.

A further display technique which is used in this context, the technique of maximum intensity projection (MIP), admittedly makes it possible to produce a three-dimensional image impression of a relatively long section of the vessel profile, but likewise still does not provide a display for reliable identification of stenoses.

In order to allow stenoses to be identified better, it is known for so-called curved planar reformation (CPR) to be used, which results in slice images whose slice plane runs along the vessel axis. This makes it possible to identify the vessel lumen and possible anomalies of the vessel on this curved slice plane. However, stenoses may be formed eccentrically in the vessel cross section, so that the correct projection direction and perspective of the CPR images is very critical for identifying stenoses such as these. If this projection direction is not correct, then individual lesions may be underestimated, or even completely overlooked. It is therefore necessary to allow the CPR images to be rotated freely about the vessel axes in order to allow eccentric stenoses in images such as these to be reliably identified and evaluated as well. However, this is dependent on determining the three-dimensional profile of the vessel axis in the volume data record on which this is based.

At the moment, two methods for producing CPR images of a vessel are known to the applicant. In the first technique, a user interactively marks the vessel axis on images of a slice stack. For this purpose the user must interactively scroll through the stack of planar images, for example of an axial, coronal, sagittal or inclined image stack, and has to mark the vessel axis by way of a graphics input device, for example a mouse. The slice plane of the CPR image is then determined from the individual marking points by linking all of the marking points to a spline curve. Since all of the marking points are created and recorded only using a two-dimensional coordinate system, the image plane on the screen, only one CPR image is obtained for a single projection direction. A different slice stack of MPR images must be produced for renewed manual marking of the vessel axis for a further projection direction, corresponding to this further projection direction.

In the second known technique for producing CPR images, a completely automatic method is used to determine the three-dimensional vessel axis in the volume data record. However, this method requires segmentation of the vessel by way of a specific semi-automatic vessel segmentation algorithm. This technique is very time-consuming, since the segmentation of the vessel for determining the vessel axis must be carried out with high precision. After segmentation, the vessel axis can then be obtained fully automatically by forming a skeleton of the segmentation mask. The slice plane for the CPR image is then produced by projecting the three-dimensional vessel axis from a predeterminable projection direction onto a two-dimensional plane, with the slice plane of the CPR image running at right angles to this along the projected profile of the vessel axis. Since this technique results in the three-dimensional profile of the vessel axis, a different CPR image can be produced from a different projection direction at any time without having to determine the vessel profile again. This allows free rotation of the displayed CPR image about the vessel axis, so that eccentric stenoses can also reliably be identified. However, the method also requires time-consuming segmentation of the vessel under consideration.

SUMMARY

In at least one embodiment of the present invention, a method and/or an apparatus is disclosed for determining the spatial profile of a vessel axis in volume data records for medical imaging, which require less time to be spent, and likewise make it possible to produce CPR images which can be rotated freely.

In a method of at least one embodiment, for determining the spatial profile of a vessel axis in volume data records for medical imaging, a volume data record of the examination area, which contains the vessel of interest, is produced in a known manner. A stack of planar slice images of the examination area or one or more MIP images of the examination area is or are calculated or extracted from the volume data record and is or are displayed to an operator. The vessel axis can then be interactively marked by the operator by setting a plurality of marking points in the illustrated images of the slice stack or in the one or more displayed MIP images. The marking points are recorded using a two-dimensional coordinate system lying on the displayed image area.

In the present method of at least one embodiment, depth inclination is now derived automatically for each marking point, on the basis of which the marking points are extended in dimension in order to obtain marking points using the three-dimensional coordinate system for the volume data record, referred to in the following text as (in dimension) extended marking points. Linking the extended marking points then results in the three-dimensional profile of the vessel axis. The link can be produced both by connecting straight lines and by other techniques, for example in the form of a spline curve.

At least one embodiment of the present method derives the depth information as a function of the displayed images, in this case. If the vessel axis is marked interactively in images of a slice stack of planar images, then the depth information is derived from the known position of the respective image in the stack. This position is known from the image recording, from the production of the slice stack or of the individual images in the slice stack in the volume data record. If the operator sets the markings in an MIP image, then the depth information is derived using the known calculation procedure for the MIP image.

During the production of an MIP image, the examination volume, or the volume data record obtained from it, is viewed from one side and only the voxel with the highest signal intensity is filtered out from each row of voxels in the viewing direction. The pixel which represents the respective row of voxels in the MIP image is given precisely this intensity. During the marking of a pixel in an MIP image, it is thus possible to determine the voxel or the depth of the voxel in the volume data record from which the marked pixel and its intensity were derived. This information can either be associated with the respective pixel while the MIP image is actually being produced, and can then be stored, or it can be determined taking account of the calculation procedure for MIP images from the volume data record.

The associated apparatus accordingly has an image display unit for displaying images of a slice stack or MIP images from a volume data record, as well as a graphics user interface, which allows an operator to interactively mark the vessel axis by setting marking points using a two-dimensional coordinate system. The apparatus also has an extension unit, which automatically derives depth information for each marking point from the known position of the respective image in the slice stack, or using the known calculation procedure for the MIP image, and extends the dimension of the marking point or points on the basis of the depth information in order to obtain extended marking points using the three-dimensional coordinate system of the volume data record. A determination unit for the apparatus then determines the three-dimensional profile of the vessel axis on the basis of the extended marking points in three-dimensional space.

The method and the associated apparatus of at least one embodiment make it possible to determine the three-dimensional profile of the vessel axis in volume data records for medical imaging, in particular in volume data records for computed tomography, with less time and computation effort. The method also makes it possible to display CPR images, which can be rotated freely, of the vessel. There is no longer any need for complex segmentation of the vessel for this purpose.

In one advantageous refinement of at least one embodiment of the present method, the pixel or voxel area surrounding the marking point is additionally automatically examined in order to determine the exact center of the vessel lumen, and thus the exact position of the vessel axis. If this position differs from the set marking point, then the marking point is corrected automatically. The surrounding area can be examined using known image processing algorithms which, for example, determine the center of the vessel in the respective area on the basis of the density values and/or of the CT values. The examination cannot only be restricted to two-dimensional planar images, for example of an axial, coronal, sagittal or oblique slice stack, which run through the corresponding marking point, but can also be carried out in the three-dimensional space of the volume data record, with sub-volumes around the marking points then being used for the examination.

CPR images are preferably produced and displayed to the operator in a known manner, based on the three-dimensional profile of the vessel axis. The operator can in this case rotate the projection direction of the displayed images freely around the vessel axis, as is already known from the prior art. For this purpose, for a new projection direction, only the three-dimensional vessel axis below the new projection direction is in each case projected onto a two-dimensional plane, and the corresponding CPR image is extracted from the volume data record using the slice plane that results from this.

BRIEF DESCRIPTION OF THE DRAWINGS

The present method and the associated apparatus will be explained briefly once again in the following text with reference to one example embodiment and in conjunction with the drawings, in which:

FIG. 1 shows a schematic illustration of an embodiment of the method procedure;

FIG. 2 shows a schematic overview illustration of an embodiment of the present apparatus; and FIG. 3 shows an example of the derivation of the depth information for a point which has been marked in the two-dimensional coordinate system of the image display plane.

DETAILED DESCRIPTION OF THE EXAMPLE EMBODIMENTS

The terminology used herein is for the purpose of describing particular embodiments only and is not intended to be limiting of the present invention. As used herein, the singular forms "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

In describing example embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Referencing the drawings, wherein like reference numerals designate identical or corresponding parts throughout the several views, example embodiments of the present patent application are hereafter described. Like numbers refer to like elements throughout. As used herein, the terms "and/or" and "at least one of" include any and all combinations of one or more of the associated listed items.

The procedure involved in an embodiment of the present method will be explained once again in the following text with reference to a schematic overview illustration. The method is a semi-automatic process for determining the three-dimensional profile of the vessel axis in a volume data record, in particular in a CT volume data record, which allows CPR images to be produced with a slice plane along the vessel of interest, and allows these images to be rotated freely about the vessel axis. In the process, the volume data record is produced first of all, and the corresponding image displays are generated from the volume data record. This can relate not only to MIP images but also to MPR images.

When MPR images of a slice stack 1 obtained from the volume data record are displayed, the user marks corresponding marking points P (x,y) along the vessel axis that can be seen in each image, in the individual slice images 2 in the slice stack 1. This is illustrated in FIG. 3, which shows the slice stack 1 in the left-hand part and a slice image 2, indicating a vessel section 3, in the right-hand part. During this process, the user interactively pages through the individual slice images 2 in the slice stack 1 in order to mark the profile of the vessel of interest. By way of example, the slice images may be axial, coronal, sagittal or oblique images.

Since the process of marking in the corresponding image displays in each case results only in marking points P (x,y) in the two-dimensional coordinate system (x,y) of the image plane, a further step of an embodiment of the present method includes the extension of these marking points P (x,y) by a further dimension z, which corresponds to the depth in the slice stack or volume data record.

In the case of the example shown in FIG. 3, the distance between the slice images 2 of the slice stack 1 in the depth direction, that is to say the z direction, is known from the production of the slice stack, so that appropriate depth information can be derived in the form of a z coordinate for each of the displayed slice images 2. This depth information is then associated with the one or more marking points P (x,y) which have been set in the respective slice image. This results in extended marking points P (x,y,z), which represent the position of the corresponding point on the vessel axis in three-dimensional space.

The extended marking points P (x,y,z) are then linked to one another in order in this way to obtain the three-dimensional profile of the vessel axis of the vessel of interest.

If the images are produced and displayed using the MIP technique, then the user marks the profile of the vessel axis of the vessel of interest in the corresponding MIP image by a plurality of marking points P (x,y). When using the MIP technique, only the intensity of the respective voxel having the maximum intensity from a series of voxels (which lie on a line running through the volume data record in the projection direction at the location of the pixel) is displayed for each pixel of the MIP image. This technique means that larger vessel sections can be seen in an MIP image than is possible when using the MPR technique.

Furthermore, this allows an association to be formed between each pixel and depth information indicating the depth within the volume data record from which the voxel on which this is based and has the highest intensity originates. Therefore, when the user sets the marking points in the vessel which can be seen in the MIP image, the corresponding depth information relating to this marking point can therefore be determined, and associated with this marking point, on the basis of the calculation procedure for the MIP image. Further processing is then carried out as has already been explained in conjunction with the MPR images in the slice stack. When using the MIP technique, it is possible to use only one MIP image, provided that the entire profile of the vessel of interest can already be seen in this image. However, it is also possible, of course, to display a plurality of MIP images produced from slices of the examination area or of the associated volume data record of different thickness, which the user then makes use of successively for marking the vessel.

Since the user may possibly not accurately mark the vessel axis of the respectively displayed vessel section during the interactive marking process, the two-dimensional or three-dimensional area surrounding the marked point is additionally examined in one advantageous refinement of an embodiment of the method. During this examination, known image processing algorithms are used to search for the geometric center of the displayed vessel. If this center, which must lie on the vessel axis of the vessel, differs from the marking point, then the marking point is appropriately corrected.

An embodiment of the proposed method makes it simpler to determine the three-dimensional profile of the vessel axis of a vessel of interest in a volume data record. The marking points P (x,y) originally set by the user in this case have a third dimension added to them, and their position may possibly be corrected, thus making it possible to determine a relatively accurate three-dimensional profile of the vessel axis. This profile is obtained by linking the extended marking points P (x,y,z), for example to a three-dimensional spline curve. Once this three-dimensional profile of the vessel axis has been determined, a curved slice plane is determined by projecting the three-dimensional curve onto a two-dimensional plane using a predeterminable projection direction.

The CPR image is then produced in a known manner by scanning the volume data record with a beam at right angles to the two-dimensional plane, which beam passes through the complete volume data record and is moved along the two-dimensional projection of the three-dimensional curve. The CPR image is then composed of the pixels which are formed from the voxels that the beam strikes. A CPR image which has been rotated with respect to this through any predetermined angel about the vessel axis can be produced in a simple manner by producing a second slice plane by projecting the three-dimensional curve onto a two-dimensional plane using an appropriately modified projection direction, with the rotated CPR image being produced in the same way on this basis. It is therefore possible to produce and display CPR images which can be rotated freely, and therefore to reliably identify and evaluate eccentric stenoses using an embodiment of the present method, in a simple manner, without any need to use complex segmentation techniques for this purpose.

FIG. 2 shows, in a highly schematic form, the fundamental design of the present apparatus in conjunction with a computed-tomography scanner 4. The computed-tomography scanner 4 produces the volume data record of the examination area, and this is stored in a memory unit 5. An image computer 6 uses this volume data record 5 to produce the corresponding image displays, and outputs them on a monitor 8 which is connected to the image computer 6. A user can use a graphics user interface 7, for example with the aid of a mouse 9, to set marking points on the image displays on the monitor 8.

The extension unit 11 uses the points P (x,y) marked using the two-dimensional coordinate system of the image area of the monitor to produce marking points P (x,y,z) to which depth information has been added. A determination unit 10 then uses the extended marking points P (x,y,z) to determine the three-dimensional profile of the vessel axis. The CPR module 12, which is likewise indicated, uses this three-dimensional profile and the volume data record on which it is based to calculate CPR images which can be rotated freely, for display on the monitor 8.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program and computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a computer readable media and is adapted to perform any one of the aforementioned methods when run on a computer device (a device including a processor). Thus, the storage medium or computer readable medium, is adapted to store information and is adapted to interact with a data processing facility or computer device to perform the method of any of the above mentioned embodiments.

The storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for determining a three-dimensional profile of a vessel axis in a volume data record for medical imaging, the method comprising:
   producing a volume data record of an examination area;
   at least one of extracting and calculating, and then displaying to an operator, at least one of a stack of a plurality of planar slice images of the examination area and one or more MIP images of the examination area from the volume data record;
   marking a vessel axis interactively by marking points using a two-dimensional coordinate system in at least one of the displayed slice images of the stack and the one or more displayed MIP images;
   deriving depth information, automatically for each marking point, at least one of from a known position of a respective slice image in the stack and using a known calculation procedure for the one or more MIP images, and extending the marking points in dimension based upon the derived depth information to obtain extended marking points using a three-dimensional coordinate system for the volume data record; and
   determining the three-dimensional profile of the vessel axis by linking the obtained extended marking points.

2. The method as claimed in claim 1, wherein the local area surrounding the extended marking points is examined automatically to determine an exact center of the vessel, and wherein the extended marking points are corrected appropriately in the event of any discrepancy from the exact center.

3. The method as claimed in claim 2, wherein a CPR slice image, which is freely rotatable, is calculated from the volume data record on the basis of the three-dimensional profile of the vessel axis, and is displayed.

4. The method as claimed in claim 1, wherein a CPR slice image, which is freely rotatable, is calculated from the volume data record on the basis of the three-dimensional profile of the vessel axis, and is displayed.

5. The method as claimed in claim 1, wherein the step of determining includes producing slice images of vessels which are obtained by curved planar reformation and are freely rotatable.

6. The method as claimed in claim 5, wherein the local area surrounding the extended marking points is examined automatically to determine an exact center of the vessel, and wherein the extended marking points are corrected appropriately in the event of any discrepancy from the exact center.

7. The method as claimed in claim 6, wherein a CPR slice image, which is freely rotatable, is calculated from the volume data record on the basis of the three-dimensional profile of the vessel axis, and is displayed.

8. An apparatus for determining a three-dimensional profile of a vessel axis in a volume data record for medical imaging, the apparatus comprising:
   an image display unit to display at least one of slice images of a slice stack and MIP images;
   a graphics user interface to allow a user to interactively mark a vessel axis on the displayed images by setting marking points using a two-dimensional coordinate system;
   an extension unit to automatically derive depth information for each marking point at least one of from a known position of a respective slice image in the slice stack and using a known calculation procedure for MIP images, and to extend the marking points in dimension based upon the depth information to obtain extended marking points using a three-dimensional coordinate system; and
   a determination unit to determine the three-dimensional profile of the vessel axis by linking the extended marking points.

9. The apparatus as claimed in claim 8, wherein the extension unit is designed to automatically examine a local area surrounding the extended marking points to determine an exact center of the vessel at this point, and to appropriately correct the extended marking points in the event of any discrepancy from the exact center.

10. The apparatus as claimed in claim 9, further comprising:
    a module to calculate a freely rotatable CPR slice image, displayable using the image display unit.

11. The apparatus as claimed in claim 8, further comprising:
    a module to calculate a freely rotatable CPR slice image, displayable using the image display unit.

12. The apparatus as claimed in claim 8, wherein the determination unit is further used to produce slice images of vessels which are obtained by curved planar reformation and are freely rotatable.

13. The apparatus as claimed in claim 12, wherein the extension unit is designed to automatically examine a local area surrounding the extended marking points to determine an exact center of the vessel at this point, and to appropriately correct the extended marking points in the event of any discrepancy from the exact center.

14. The apparatus as claimed in claim 13, further comprising:
- a module to calculate a freely rotatable CPR slice image, displayable using the image display unit.

15. An apparatus for determining a three-dimensional profile of a vessel axis in a volume data record for medical imaging, the apparatus comprising:
- means for displaying at least one of slice images of a slice stack and MIP images;
- means for allowing a user to interactively mark a vessel axis on the displayed images by setting marking points using a two-dimensional coordinate system;
- means for automatically deriving depth information for each marking point at least one of from a known position of a respective slice image in the slice stack and using a known calculation procedure for MIP images, and for extending the marking points in dimension based upon the depth information to obtain extended marking points using a three-dimensional coordinate system; and
- means for determining the three-dimensional profile of the vessel axis by linking the extended marking points.

16. The apparatus as claimed in claim 15, wherein the means for automatically deriving is designed to automatically examine a local area surrounding the extended marking points to determine an exact center of the vessel at this point, and to appropriately correct the extended marking points in the event of any discrepancy from the exact center.

17. The apparatus as claimed in claim 16, further comprising:
- means for calculating a freely rotatable CPR slice image, displayable using the means for displaying.

18. The apparatus as claimed in claim 15, further comprising:
- means for calculating a freely rotatable CPR slice image, displayable using the means for displaying.

19. The apparatus as claimed in claim 15, wherein the means for determining is further used to produce slice images of vessels which are obtained by curved planar reformation and are freely rotatable.

* * * * *

UNITED STATES PATENT AND TRADEMARK OFFICE
CERTIFICATE OF CORRECTION

PATENT NO. : 7,881,512 B2  Page 1 of 1
APPLICATION NO. : 11/826435
DATED : February 1, 2011
INVENTOR(S) : Christian Asbeck It is certified that error appears in the above-identified patent and that said Letters Patent is hereby corrected as shown below:

Title Page, Item (30) should read

Foreign Application Priority Data

Jul. 17, 2006    (DE)    ................    10 2006 032 990.2

Signed and Sealed this
Twenty-sixth Day of April, 2011

David J. Kappos
*Director of the United States Patent and Trademark Office*